(No Model.)
F. J. SPRAGUE.
ELECTRIC MOTOR AND GENERATOR.
No. 315,182. Patented Apr. 7, 1885.
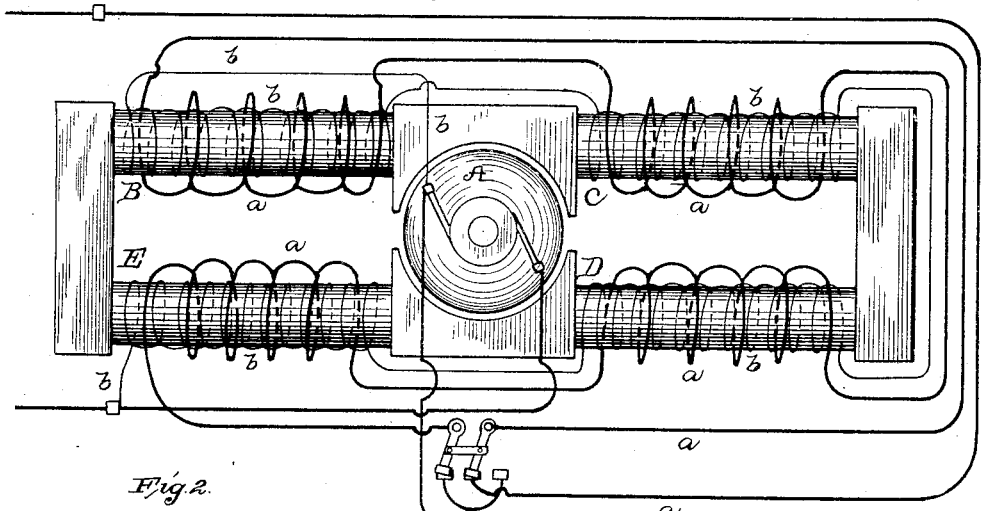
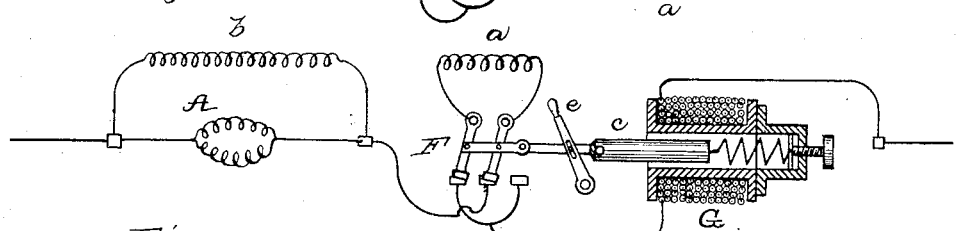
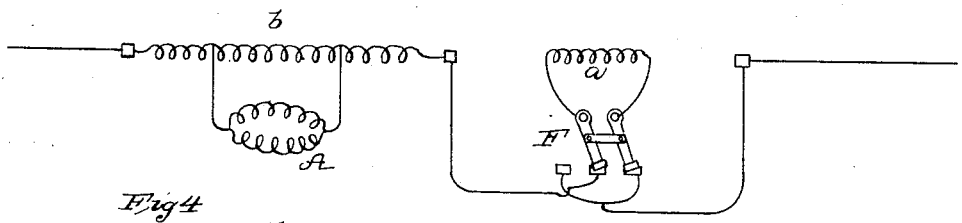
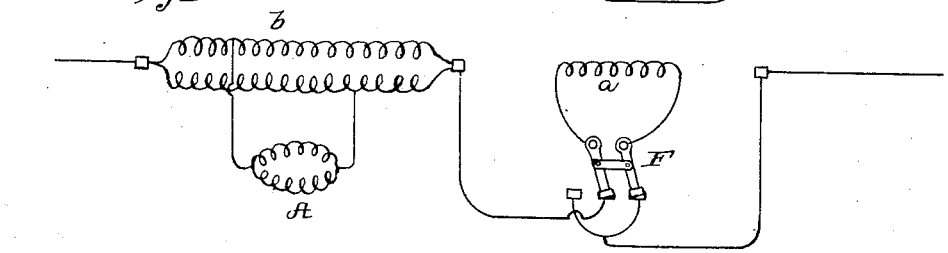
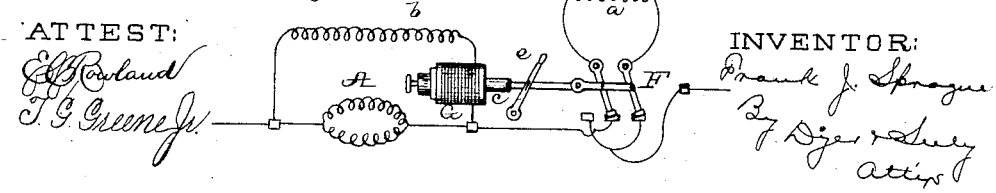
ATTEST:  
INVENTOR:  
Frank J. Sprague  
By Dyer & Seely  
Attys

UNITED STATES PATENT OFFICE.

FRANK J. SPRAGUE, OF NEW YORK, N. Y.

ELECTRIC MOTOR AND GENERATOR.

SPECIFICATION forming part of Letters Patent No. 315,182, dated April 7, 1885.

Application filed July 19, 1884. (No model.)

*To all whom it may concern:*

Be it known that I, FRANK J. SPRAGUE, of New York, in the county and State of New York, have invented a certain new and useful Improvement in Electric Motors and Generators, of which the following is a specification.

This invention relates to that class of differentially-wound electro-dynamic motors and dynamo-electric generators in which the main field-coil is shunted around the armature alone, the series or governing coil being outside the terminals of the main field-shunt. My object is to render such motors and generators self-regulating, so that the motor will run at a constant speed under varying loads on either a constant potential or a constant current circuit, or the generator may develop a constant current or a constant electro-motive force.

The invention was designed with especial reference to motors, and I shall therefore describe it more particularly in that connection, explaining, however, its adaptability to dynamo-electric machines used as generators.

I have found that a certain proportion must exist between the series-coil and the shunt-coil in machines of this character, whether used with constant potential or constant current, in order that they may be perfectly self-regulating, and it is in this way of proportioning the coils that my invention mainly consists.

For the class of machines mentioned the proportions which I have devised are the same in all cases, and whether the machine is used with constant current or constant potential, although the numerical values will depend upon the current and potentials used and the power required. It follows, of course, that a motor wound according to my invention may be used either on a constant current or a constant potential circuit, and will run at a constant speed in either case.

My invention can be most readily set forth and the above statements shown to be correct by a mathematical demonstration.

The magnetic moment of a coil may be defined as the product of the ampères flowing therein by the number of turns, and if the main and governing coils are practically similarly situated with regard to the field-magnet cores the magnetic field may be considered as proportional to the effective magnetic moment—that is, to the difference of the magnetic moments of the shunt and series fields, so long as we are working on a straight or nearly straight line characteristic. This characteristic can be determined for any particular cores in any of the well-known ways—for instance, by running the motor as a dynamo at a constant speed, passing variable known currents through the field-coils and noting the potential existing at the free armature-terminals.

For a properly-constructed motor the field-magnet must at no time be too highly saturated—that is, it must be worked with a characteristic which is a straight or very nearly a straight line. As will be pointed out later, some deviation may be allowed, but not much.

I will first consider the motor with varying loads in a constant potential circuit and running at constant speed.

Let $f$ denote the resistance of the main or shunt field-coils; $m$, the number of turns therein; $r$, the resistance of the differential or series field-coils, and $n$ the number of turns; R, the resistance of the armature; E, the initial potential at the terminals of the motor; $e$, the counter electro-motive force set up in the armature; C, the total current flowing over $r$. Then the potential existing at the shunt-terminals will be $E - rC$ $$\frac{E-rC}{f} = \text{shunt-current},$$

$$\frac{E-rC-e}{R} = \text{armature current} \quad \frac{E-rc}{f} +$$

$$\frac{E-rC-e}{R} = C, \text{ or } ER - rCR + fE - rfC - ef = CRf, \text{ or } CRf + rfC + rRC = fE - ef + ER,$$

whence $C = \dfrac{f(E-e)+ER}{fR+(f+R)r}$ work done $= e$ $\dfrac{E-rC-e}{R}$. But since C can be expressed in terms of $e$ and constants, the work can be also expressed in terms of $e$ and constants $m\dfrac{E-rC}{f}$ $=$ shunt-current, $nC=$ series-current, $m\dfrac{E-rC}{f}$ $-nC=$ effective moment.

$$= m\frac{E-r\frac{f(E-e)+ER}{fR+(f+R)r}}{f} - n\frac{f(E-e)+ER}{fR+(f+R)r}.$$

But our conditions are such that $$\frac{e}{e'} = \frac{m\frac{E-r\frac{f(E-e)+ER}{fR+(f+R)r}}{f} - n\frac{f(E-e)+ER}{fR+(f+R)r}}{m\frac{E-r\frac{f(E-e')+ER}{fR+(f+R)r}}{f} - n\frac{f(E-e')+ER}{fR+(f+R)r}}$$

$$\frac{e}{e'} = \frac{mE[fR+(f+R)r]-mr[f(E-e)+ER]-n f[f(E-e)+ER]}{mE[fR+(f+R)r]-mr[f(E-e')+ER]-n f[f(E-e')+ER]},$$

or $mEefR + mEefr + mErR - merfE + merfe'$
$\quad -merER - enf^2E + enf^2e' - enfER =$
$mEe'fR + mEe'fr + mEe'rR - me'rfE + me'rfe$
$\quad -me'rER - e'nf^2E + e'nf^2e - e'nfER$ Canceling, we have $mfR(e-e') = nf^2(e-e') + nRf(e-e')$ or $\frac{m}{n} = \frac{f+R}{R}$. That is, the number of turns in the shunt main field-coils bear the same ratio to the number of turns in the series differential field-coils as the sum of the resistances of the shunt field-coils and the armature bear to the resistance of the armature. This is the law of winding for a machine of this character, and so wound the machine will be perfectly self-regulating for any constant potential and for any load up to the maximum allowed.

A peculiarity of machines so wound, which I will now describe, is pointed out in connection with the other class of compound wound motors in the application already referred to. The ratio of the magnetic moments of the shunt and series fields is—

$$\frac{mE-mr\frac{f(E-e)+ER}{fR+(f+R)r}}{f}$$
$$\frac{n f(E-e)+nER}{fR+(f+R)r}$$

or $\frac{mE[fR+(f+R)r]-mr[f(E-e)+ER]}{f[nf(E-e)+nER]}$

If $e=0$, this becomes $$\frac{mEfR+mEfr+mERr-mrfE-mrER}{f^2nE+fnER},$$

or $\frac{mR}{n(f+R)}$, but $\frac{m}{n} = \frac{f+R}{R}$. Hence the ratio becomes $\frac{mn}{nm} = 1$—that is to say, if a motor of this character is at rest and the series-coil in its normal governing position, if circuit be closed to the motor, a zero-field, or nearly so, will be produced; for under these circumstances the magnetic moments are equal, and either the motor will not start at all, or if it does start will run at a very great speed, take the maximum current at any given potential, and do little work, or none at all. I would again state what I have already pointed out, that the motor will regulate itself perfectly for all potentials so long as we work with a straight-line characteristic; but it must be with a theoretical efficiency of not less than fifty per cent., for if we go below this the governing-coil works in the wrong direction.

Referring to the equation $\frac{m}{n} = \frac{f+R}{r}$, it will be seen that $m$ and $f+R$ can be increased in the same ratio. This means that the determined constant speed of the motor can be varied for any given potential; also, $m$ and $n$ can be increased in the same ratio—that is, if means are provided for varying the effective magnetic moments of shunt and series coils, the motor can be set to run at different determined speeds.

I will now consider the motor with constant-speed, varying load, and constant current. Let the turns, resistance, &c., be designated as before. E is the variable potential at the terminals of the shunt-field, and $e$ the corresponding counter electro-motive force. We must eliminate E and express the work in terms of $e$ and constants. $e$ depends on speed and strength of field; but since speed is constant $e$ depends on the field alone. $\frac{E}{f}$ = current in shunt-field, $\frac{E-e}{R}$ = current in armature, K = current in series-field, and therefore $K = \frac{E}{f} + \frac{E-e}{R}$; whence $fRK = ER + (E-e)f$, or $\frac{E}{f} = \frac{RK+e}{f+R}$. Our conditions are—

$$\frac{e}{e'} = \frac{\frac{mRK+me}{f+R} - nK}{\frac{mRK+me'}{f+R} - nK},$$

or $\frac{e}{e'} = \frac{mRK+me-fnK-RnK}{mRK+me'-fnK-RnK}$, or $emRK+mee'-fnKe-RnKe = e'mRK+mee'-fnKe'-RnKe'$, or $(e-e')mRK = (e-e')fnK + (e-e')RnK$, or $\frac{m}{n} = \frac{f+R}{R}$. This is the same law of winding that holds when a machine of the same class is used for constant potential, and the same remarks in regard to the zero-field apply as in the former case; also, as in the former case, the speed for any given current can be varied by varying the resistance and turns or the effective turns.

It follows from the foregoing that a machine depending for its regulation upon this differential winding will regulate with a constant current only when working at less than fifty per cent. armature efficiency, and that the same machine with the same winding will regulate on a constant potential circuit only when working at over fifty per cent. armature efficiency.

The law above set forth is for pure electro-dynamic motors. If there is any permanent magnetism, as in hard cast-iron, or where permanent steel magnets are used, the law of winding is modified in so far as the residual or permanent magnetism is the equivalent of an electro-magnetic moment; but in this case, too, there should exist a zero-field if the governing-coil is normally closed when the motor is at rest. I may here point out the fact that even with a slight flattening of the field characteristic the motor wound according to my invention may be self-regulating, because of the distortion of the lines of force by the current in the armature.

A motor constructed with different proportions than those herein set forth, or with a much curved field characteristic, may regulate to a certain extent, but not with the same range that I obtain. With a high potential the speed of such a motor will at first drop as the load is increased, then come to normal, then increase, and if the load be still further augmented then stop and reverse, because the governing-coil becomes predominant, or it will drop and then increase to normal with the maximum load, but if put on any higher potential will act as in the instance first cited.

The fact, hereinbefore pointed out, that in the best self-regulating motor there is a zero or very weak field when the motor is started, necessitates, especially when it is desired to start at a speed not greater than the normal, or when there is any load on the motor, in which case there is danger of burning out, the use of devices whereby the action of the governing-coil may be modified. This may be done by the introduction of a resistance, by shunting the coil with a resistance, or by the variable shunting of the armature upon the main field-coils. I prefer, however, to use a switch to short-circuit the governing-coil, or to short-circuit and reverse it. If it is reversed, then the first rush of current makes a very strong field, instead of reducing it to zero, or nearly so, increases the rotary effort, and prevents the burning out of the machine. As an instance, if a constant potential motor have the series-coil reversed when the circuit is closed, if there is margin enough on the field characteristic, we will have a field twice as strong as the strongest normal field, four times the strength when the motor is doing its maximum work per unit of time, and a momentary rotary effort eight times that existing when the maximum work is on. As soon as the speed comes up the governing-coil is short-circuited and then reversed, and then the motor is self-regulating.

In a machine wound according to my invention if the maximum work per turn is exceeded when the governing-coil is normal, the motor will slow down and stop with a zero-field; hence it is sometimes desirable to provide, in connection with the reversing-switch for the series-coil, automatic devices for operating the same controlled by variations in current, so that if at any time the maximum work per turn is accidentally exceeded the governing-coil will be short-circuited and reversed, and thus the rotary power and counter electro-motive force will be increased and the motor prevented from stopping or burning out.

The proportions above described are equally applicable to the winding of the field-magnets of dynamo-electric generators, the action being simply reversed in these machines.

My invention is illustrated in the annexed drawings, in which Figure 1 is a view, partly in diagram, of a motor embodying my invention; Fig. 2, a diagram illustrating an automatic arrangement for the series-coil switch for a constant potential circuit. Figs. 3 and 4 are diagrams illustrating the variable shunting of the armature upon the main field, and Fig. 5 is a diagram of an automatic arrangement of the series-coil switch adapted for a constant-current circuit.

Like letters refer to corresponding parts in all these figures.

The motor shown in Fig. 1 is one having field-magnet cores extending in different directions from the same pole-pieces. My invention is, however, applicable to any other usual arrangement of field-magnets.

A is the armature, and B C D E are the field-magnet cores. The coarse differential coil $a$ is in series with the armature, and the finer main coil $b$ in a shunt around the armature alone. These coils are to be wound according to the proportions hereinbefore specified. It is of course understood, however, that such proportions are not in reality illustrated in the drawings, which are intended only to show the general arrangement of the circuits.

F is the reversing-switch for the series-coil. It may have any one of three positions. In that shown in Figs. 3 and 4 the coil is directly in circuit and opposes the shunt-coil $b$. As in Figs. 1 and 2, current is reversed in the coil, and it therefore assists the shunt-coil.

In its intermediate position, which is not illustrated in the drawings, the movable contacts cross the stationary ones and short-circuit or cut out the coil. When the motor is started the coil is reversed, as has been already explained, and as soon as the proper speed is reached it is short-circuited and thrown back to its normal position again.

The automatic device for the switch shown in Fig. 2 is a solenoid, G, placed in the armature-circuit, and having its movable spring-retracted core $c$ connected with switch F. If the maximum load or work per turn on the motor is exceeded, so that too much current passes in the armature and series coil, such excessive current causes the solenoid to move the switch and first short-circuit and then reverse the series-coil. The switch is also provided with the handle $e$, for working it by hand in starting the machine. At a normal current—that is, with any load up to the maximum—the spring keeps the switch in its normal position with the current direct in the series-coil.

In the arrangement shown in Fig. 5 the solenoid G is placed in the shunt field-circuit, this being for a constant-current circuit. An increase of load and armature-current diminishes the current in the shunt and weakens the solenoid, so that the spring moves the core to reverse the current in the series-coil.

Figs. 3 and 4 illustrate the gradual throwing into circuit of the armature. The terminals $p\ p$ are movable upon the sections of the main field-coils, a suitable commutator being employed. Fig. 4 shows the closed field-circuit set forth in my application No. 134,321.

I do not claim herein, broadly, the motor wound so as to produce a zero-field if circuit is closed when the motor is at rest, this being claimed in my application Serial No. 138,146.

What I claim is—

1. A compound wound electro-dynamic motor or dynamo-electric generator having its two field-coils proportioned substantially as hereinbefore set forth—that is, so that the number of turns in the shunt-coil bears the same ratio to the number in the series-coil as the sum of the resistances of the shunt-coil and the armature bears to the resistance of the armature.

2. An electro-dynamic motor having two sets of field-magnet coils whose magnetizing effects are equal, or nearly so, and opposed, if circuit is closed, to both sets of coils when the motor is at rest, one of said sets being in series with the armature and the other in a shunt around the armature alone.

3. An electro-dynamic motor having two sets of field-magnet coils whose magnetizing effects are equal, or nearly so, and opposed, if circuit is closed, to both sets of coils when the motor is at rest, one of said sets being in series with the armature and the other in a shunt around the armature alone, in combination with means for modifying the magnetizing effect of said series-coils, substantially as set forth.

4. An electro-dynamic motor having two sets of field-magnet coils whose magnetizing effects are equal, or nearly so, and opposed, if circuit is closed, to both sets of coils when the motor is at rest, one of said sets being in series with the armature and the other in a shunt around the armature alone, in combination with means for short-circuiting the said series-coils, substantially as set forth.

5. An electro-dynamic motor having two sets of field-magnet coils whose magnetizing effects are equal, or nearly so, and opposed, if circuit is closed, to both sets of coils when the motor is at rest, one of said sets being in series with the armature and the other in a shunt around the armature alone, in combination with means for reversing the current in said series-coils, substantially as set forth.

6. An electro-dynamic motor having two sets of field-magnet coils whose magnetizing effects are equal, or nearly so, and opposed, if circuit is closed, to both sets of coils when the motor is at rest, one of said sets being in series with the armature and the other in a shunt around the armature alone, in combination with an electro-magnetic device in the shunt field-circuit for modifying the magnetizing effect of the said series-coils, substantially as set forth.

7. An electro-dynamic motor having two sets of field-magnet coils whose magnetizing effects are equal, or nearly so, and opposed, if circuit is closed, to both sets of coils when the motor is at rest, one of said sets being in series with the armature and the other in a shunt around the armature alone, in combination with a short-circuiting and reversing switch for said series-coils, and an electro-magnetic device in the shunt field-circuit for moving said switch, substantially as set forth.

This specification signed and witnessed this 2d day of July, 1884.

FRANK J. SPRAGUE.

Witnesses:
RICHD. N. DYER,
ALFRED W. KIDDLE.

It is hereby certified that in Letters Patent No. 315,182, granted April 7, 1885, upon the application of Frank J. Sprague, of New York, New York, for an improvement in "Electric Motors and Generators," certain errors appear in the printed specification requiring correction, as follows: (1.) Line 81, page 1, to line 3, page 2, inclusive, should read as follows: Then the potential existing at the shunt-terminals will be $E-rC$; $\frac{E-rC}{f}$ = shunt current; $\frac{E-rC-e}{R}$ = armature current; $\frac{E-rC}{f} + \frac{E-rC-e}{R} = C$, or $ER-rCR+fE-rfC-ef=CRf$, or $CRf+rfC+rRC=fE-ef+ER$, whence $C = \frac{f(E-e)+ER}{fR+(f+R)r}$; work done $= e\frac{E-rC-e}{R}$. But since $C$ can be expressed in terms of $e$ and constants, the work can be also expressed in terms of $e$ and constants. $m\frac{E-rC}{f}$ = shunt moment; $nC$ = series moment; $m\frac{E-rC}{f} - nC$ = effective moment $= m\frac{E-r\frac{f(E-e)+ER}{fR+(f+R)r}}{f} - n\frac{f(E-e)+ER}{fR+(f+R)r}$.

(2.) In line 18, page 2, for "$m$ErR" read "$m$EerR."

(3.) In line 109, page 2, the sign "=" should be inserted after "$\frac{e}{e'}$."

(4.) In the 2d, 3d, 4th, 5th, 6th, and 7th claims, in the 4th line of each of said claims, the comma after the word "closed" should be omitted.

And it is certified that the proper corrections have been made in the files and records pertaining to the case in the Patent Office, and should be read in said Letters Patent to make the same conform thereto.

Signed, countersigned, and sealed this 19th day of May, A. D. 1885.

[SEAL.]            H. L. MULDROW,

*Acting Secretary of the Interior.*

Countersigned:

M. V. MONTGOMERY,

*Commissioner of Patents.*